(No Model.)
W. A. HULL.
YEAST CAKE.
No. 413,944. Patented Oct. 29, 1889.
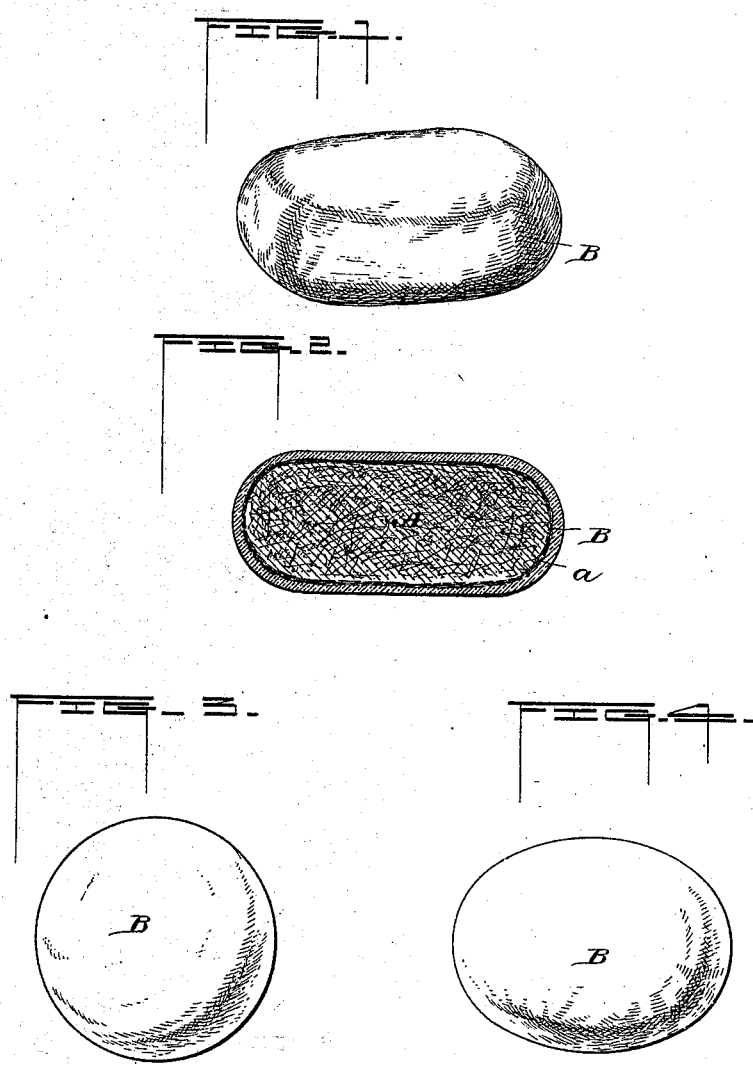
WITNESSES:
INVENTOR,
Wolcott A. Hull
By Gifford and Brown
Att'ys.

UNITED STATES PATENT OFFICE.

WOLCOTT A. HULL, OF NEW YORK, N. Y.

YEAST-CAKE.

SPECIFICATION forming part of Letters Patent No. 413,944, dated October 29, 1889.

Application filed July 6, 1889. Serial No. 316,714. (No specimens.)

*To all whom it may concern:*

Be it known that I, WOLCOTT A. HULL, of New York, in the county and State of New York, have invented certain new and useful Improvements in Yeast-Cakes; and I do hereby declare the following to be a full, clear, and exact description of the invention, such as will enable others skilled in the art to which it appertains to make and use the same.

My invention relates to an improvement in yeast-cakes.

The object is to provide a yeast-cake the exterior surface of which shall be well adapted to receive a coating, which coating shall effectually exclude the atmosphere and present no sharp angles liable to interfere with the integrity of the coating.

With these ends in view my invention consists in a yeast-cake having its exterior surface of rounded conformation free from sharp angles.

My invention further consists in certain features of construction, as will be hereinafter described.

In the accompanying drawings, Figure 1 represents one form of the yeast-cake in perspective, and Fig. 2 represents a longitudinal section of the same. Figs. 3 and 4 represent two of several different shapes which the cake may assume other than that shown in Figs. 1 and 2.

A represents the body of the yeast-cake, having the yeast incorporated preferably with prepared corn-meal, formed in such shape that its exterior surface $a$ will present no sharp angles. The portion A is usually formed under great pressure, the effect of which is to force the finer granules of the prepared corn-meal to the surface, forming a thin compact crust at $a$, which in itself, as I find from experiment, serves to protect for a considerable length of time the yeast-plant throughout the interior portion of the cake from the deleterious action of the atmosphere. The rounded exterior surface of the cake, furthermore, furnishes a suitable form adapted for the reception of a complete smooth coating B, preferably of sugary matter, which when applied presents no sharp angles upon its exterior surface, and hence furnishes an effective bar to the admission of the atmosphere throughout the entire extent of the surface and of substantially uniform thickness.

I have represented a few only of numerous forms which the cake might assume and yet have its exterior surface free from sharp angles, and which would therefore fairly fall within the scope of my invention.

What I claim is—

1. A yeast-cake having its exterior surface free from sharp angles, substantially as set forth.

2. A yeast-cake having a thin exterior surface-crust formed of the cake material, the exterior surface of said crust being rounded throughout and free from sharp angles, substantially as set forth.

3. A yeast-cake the exterior surface of which is adapted to receive an envelope or coating, being of rounded form throughout and free from sharp angles, substantially as set forth.

In testimony whereof I have signed this specification in the presence of two subscribing witnesses.

WOLCOTT A. HULL.

Witnesses:
   E. C. SEWARD,
   BENJ. G. COWL.